F. JACKSON.
SWINGING SEARCH LIGHT FOR AUTOMOBILES AND OTHER VEHICLES.
APPLICATION FILED AUG. 13, 1912.
1,097,588.   Patented May 19, 1914.
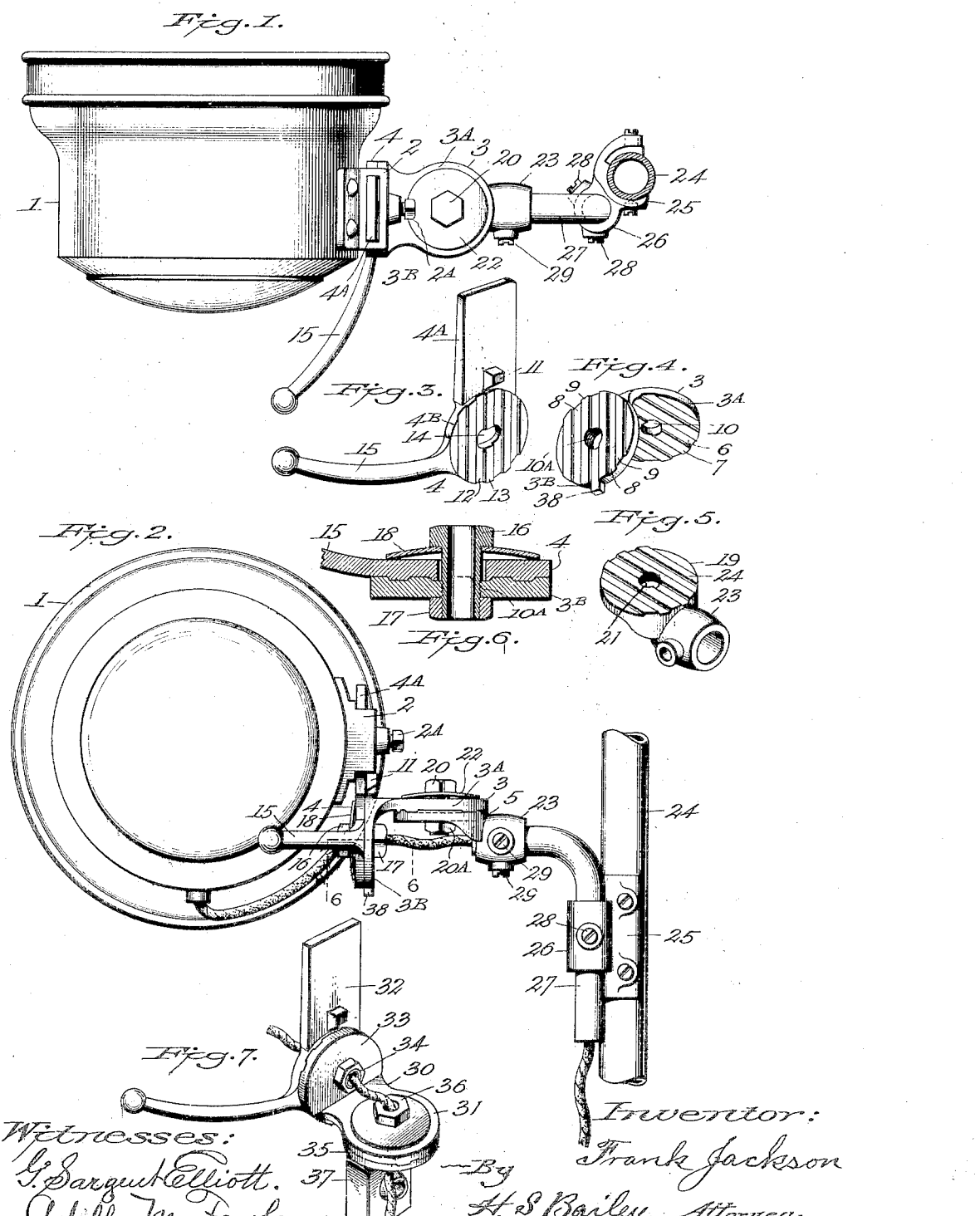

UNITED STATES PATENT OFFICE.

FRANK JACKSON, OF DENVER, COLORADO.

SWINGING SEARCH-LIGHT FOR AUTOMOBILES AND OTHER VEHICLES.

1,097,588.  Specification of Letters Patent.  Patented May 19, 1914.

Application filed August 13, 1912. Serial No. 714,846.

*To all whom it may concern:*

Be it known that I, FRANK JACKSON, a citizen of the United States of America, residing in the city and county of Denver and State of Colorado, have invented a new and useful Swinging Search-Light for Automobiles and other Vehicles, of which the following is a specification.

This invention relates to improvements in swinging searchlights and particularly in variably adjustable brackets for attaching the same to automobiles and other vehicles.

The object of the invention is to provide a bracket of this character which permits of the lamp being turned to stand at any desired angle either on a horizontal or a vertical axis. Further, to provide a support comprising a right angled plate, and plates pivotally clamped to the members of said right angled plate, one of which connects with the lamp, while the other connects with a suitable part of the automobile, the plates being under resilient clamping tension with respect to the angle plate members, so that they engage them frictionally, means being provided whereby the engaging plates lock automatically when the lamp is in a given position on either its horizontal or vertical axis, and is prevented from accidental movement from such position. These objects are accomplished by the mechanism illustrated in the accompanying drawings, in which:

Figure 1, is a plan view showing the improved bracket, a lamp secured thereto, and means for adjustably connecting the said bracket with the side rod of a wind shield. Fig. 2, is a side view of the device shown in Fig. 1. Figs. 3, 4, and 5, are perspective views of the parts constituting the bracket. Fig. 6, is a sectional view—full size—on the line 6—6 of Fig. 2. And Fig. 7, is a perspective view showing a slightly different form of the bracket.

Similar letters of reference refer to similar parts throughout the several views.

In order to discern house numbers and the names of streets or direction-indicating signs, or to direct the light upon the road in the immediate vicinity of the automobile, it is essential that one or both of the side lamps should be so mounted as to be capable of being swung in a horizontal plane, or tilted to throw its rays either upward or downward, and this essential is met in the form of bracket hereinafter described.

Referring to the accompanying drawings,—The numeral 1 designates an automobile side lamp or searchlight of the usual style, which is provided with a suitable socket 2, by which it may be secured to a bracket which may be secured to the automobile.

In the present instance, the bracket to which the lamp is secured forms the essential feature of my invention, and this bracket comprises three parts or members, 3, 4, and 5, which are constructed and arranged as follows: The member 3 is in the form of an angle plate, one wing of which is substantially circular in form, and is integrally connected to the other wing, which is preferably circular in form. The under face of the horizontal wing $3^A$ of the plate, is provided with equi-distant shallow longitudinal grooves 6, which form alternating ribs or raised portions 7 of the same depth, and the sides of the groove are flared or outwardly inclined as shown. The outer face of the vertical wing $3^B$ of the plate is also formed with equi-distant longitudinal grooves 8, which form alternating ribs or raised portions 9, and the sides of these grooves are also outwardly inclined. The wings $3^A$ and $3^B$ of the plate are provided with central apertures 10 and $10^A$ respectively, the aperture $10^A$ being threaded, as clearly shown in Fig. 4.

The member 4 of the bracket, comprises a vertically disposed strip, the upper portion of which is in the nature of a tongue $4^A$, which is adapted to enter the socket 2 of the lamp, in which it is secured by a set screw $2^A$, a stop lug 11 being formed on the tongue against which the bottom of the socket 2 rests, as shown in Fig. 2. The lower portion of the member 4 is rounded and formed with a circular face $4^B$, which is provided with alternating grooves and ribs 12 and 13 respectively, which are adapted to interlock with the corresponding grooves and ribs 8 and 9 of the vertical wing $3^B$ of the angle plate 3, and this rounded portion of the member 4 is provided with a central elongated opening 14, which registers with the opening $10^A$ of the wing $3^B$.

From one side of the grooved end of the member 4, projects a handle 15, for manipulating the lamp, as will fully appear hereinafter.

The lamp-holding member 4 is clamped to the wing $3^B$ of the angle plate, by a bolt 16, which passes loosely through the elongated hole 14, and is threaded to the hole 10^A in the wing 3^B, a locking nut 17 being screwed upon the outer end of the bolt against the said wings. Between the head of the bolt 16, and the lamp holding member, is interposed a spring washer 18, which is slightly bowed, as shown in Figs. 2 and 6, and when the bolt 16 is screwed hard upon this washer, the parts 3^B and 4 are held together under a resilient clamping pressure, which causes the interlocking grooves and ribs in the parts to hold the lamp in its normal position, or so that its axis is on a horizontal plane; and when the handle 15 is grasped and the lamp-holding part 4 is turned axially with respect to the part 3^B, so as to disconnect the grooves and ribs of one part from those of the other, the frictional engagement of the ribs of the two parts under the tension effected by the spring washer, will serve to hold the part 4 with the lamp, at any angle to which it may be turned. When the lamp is turned back to its normal position, the grooves and ribs of the parts will interlock automatically, as will be understood. The bolt 16 is preferably a hollow bolt, as shown most clearly in Fig. 6, and the feed wires leading from the lamp are passed through this bolt, for a purpose to be hereinafter set forth.

The connection of the part 4 with the part 3^B, provides for tipping the lamp so as to direct its rays either upward or downward. The swinging of the lamp through the arc of a circle, and on a horizontal plane, is accomplished in the following manner: To the under side of the wing 3^A of the angle plate, is clamped a stationarily mounted circular plate 19, by a bolt 20, which passes loosely through the aperture 10 in the member 3^A, and through a threaded aperture 21 in the plate 19, a locking nut 20^A being screwed upon its end against the plate 19, and a bowed spring washer 22 is interposed between the head of the bolt and the wing 3^A. The engaging face of the plate 19 is formed with grooves 23, alternating with ribs 24, which grooves and ribs interlock with those of the wing 3^A, when the lamp is in its normal horizontal position. When it is desired to swing the lamp on a horizontal plane, either to the right or left, the handle 15 is grasped and the angle plate is turned on its axis, upon the plate 19, carrying with it the lamp-holding member, and the angle plate is held in the desired position with respect to the plate 19, by the frictional engagement of the faces of the ribs of the wing 3^A and those of the plate 19 under the resilient pressure exerted by the bowed spring washer 22.

The plate 19 is formed with a depending horizontally disposed hub 23, by which the plate may be secured to a suitable arm or bracket, which passes through the said hub and is attached to the automobile. In the present instance, however, the variable adjustable bracket constituting my invention, is preferably arranged for attachment to one of the side bars of a wind shield, and I accomplish this in the following manner: Upon one of the side bars 24, of any of the commonly used wind shields, is secured a support, which comprises a substantially semi-cylindrical member 25, which is clamped in any suitable manner to the bar 24, and an integral hub 26 which lies parallel with the part 25, as shown. Through the hub 26 is passed a piece of metal tubing 27, the upper portion of which is bent to stand at right angles to the part passing through the hub 26, and is preferably of less length. The tube is held in the hub 26 by set screws 28, as shown, or in any other suitable manner, and the short, horizontal portion of the tube is passed through the hub 23 of the plate 19, set screws 29 being employed to secure the hub 23 upon the end of the said tube as shown. It will thus be seen that the tube 27 may be turned axially in the hub 26, and secured in any desired position, and should the wind shield and consequently its side bars stand at either a forward or backward inclination, the hub 23 of the plate 19 can be turned upon the end of the tube 27, to bring the axis of the lamp on a horizontal plane.

By employing the tube 27 and the tubular bolt 16, I provide a practical and convenient manner of disposing of the feed wires leading from the lamp, the said wires being passed through the bolt and thence down through the tube 27 to a storage battery or other source of current power. By this means the wires are not only protected and kept out of the way, but they are not affected either by the tilting of the lamp on a horizontal axis or the swinging of the same on a vertical axis, as will be understood by reference to Fig. 2.

In Fig. 7 I have illustrated a bracket embodying the same principle as embodied in the form of bracket above described, but arranged in a slightly different manner, or so that it may be attached to a support on the side of the car. In this arrangement an angle plate 30 is employed, the wings of which have grooved faces similar to those of the angle plate 3, but the horizontal wing 31 of this plate projects from below the center of the vertical wing, instead of from above its center, as in the plate 3. A lamp supporting member 32, is clamped to the vertical wing 33, of the angle plate, by a tubular bolt 34, and the member 32 is identical with the member 4, as shown in Fig. 3. To the under side of the wing 31, of this angle plate, is clamped a circular plate 35, by a tubular bolt 36, the engaging faces of these two parts being grooved as in the corresponding parts of the previously-described bracket; and from the under side of the plate 35 depends a socketed lug 37, for attaching the bracket to the common form of supporting arm. The tubular bolts 34 and 36, in this form of the bracket, permit the feed wires from the lamp to be passed through them, and thence to the storage battery, and by this means the wires are not only conveniently disposed of and so as to be out of the way, but they are not kinked or twisted when the lamp is operated.

In operation, when it is desired for any purpose to shift the lamp from its normal position as shown in Figs. 1 and 2, the handle 15 is grasped and the lamp may be tilted to throw the rays of light at either an upward or downward inclination, or the lamp may be swung on a horizontal plane and then tilted, in any of which positions it will be held stationary by the frictional engagement of the bracket members, as above described. When the lamp is swung back to its normal position, the engaging faces of the parts 3$^A$ and 19 will interlock automatically, and thus indicate the said position, and when the lamp is tilted to its normal position to throw its rays in a horizontal plane, the normal position is indicated by the interlocking automatically of the engaging faces of the parts 3$^B$ and 4, as previously described.

When desired, the lamp carrying member 4, may be shifted on its axial bolt 16, so that its grooved face can not interlock with the corresponding face of the wing 3$^B$, when the lamp is tilted up and down, and this is accomplished in the following manner: As previously mentioned, the hole 14 in the part 4 is an elongated hole, through which the bolt 16 passes loosely. A lug 38 depends from the lower edge of the wing 3$^B$, in position to be engaged by the stop lug 11, on the member 4, when the lamp is turned substantially one-half of a complete revolution, and when the lug 11 engages and is pressed hard against the lug 38, by the handle 15, the member 4 will be shifted slightly so that its axial center will lie to one side of the axial center of the member 3$^B$, thus preventing the parts from becoming interlocked, as the faces of the ribs will always be in frictional engagement, regardless of the position of the member 4 with respect to the member 3$^B$.

Having described my invention, what I claim as new and desire to secure by Letters Patent, is:

1. In a lamp bracket as specified, an adjustable stationary plate having a ribbed face, an angle plate the wings of which have ribbed faces, one of which engages the corresponding face of the stationary plate, an axial pivot bolt connecting said wing and plate, and a bowed spring washer on said bolt under compression between its head and the said wing; an axial bolt extending from the other wing of the angle plate, a lamp-holding arm mounted on said bolt having a ribbed face in engagement with the corresponding face of the wing, a bowed spring washer on the bolt under compression between its head and the lamp arm, and a handle on the lamp arm whereby the same may be turned with respect to the angle plate, and the arm and angle plate may be turned with respect to the stationary plate.

2. In a lamp bracket as specified, an adjustably mounted stationary plate, an angle plate, one wing of which is axially pivoted to the stationary plate and in resilient frictional contact therewith, said angle plate having a swinging movement on a horizontal plane; a lamp holding arm, one end of which is axially pivoted to the other wing of the angle plate in resilient frictional contact therewith, and a handle on the lamp holding arm.

3. In a lamp bracket as specified, the combination with the side bar of a wind shield and a right angled arm connected thereto, of a plate having a hub secured upon the horizontal portion of said arm, an angle plate, one wing of which is axially pivoted to said plate, and in resilient frictional contact therewith, a lamp holding arm, one end of which is axially pivoted to the other wing of said angle plate in resilient frictional contact therewith, and a handle on the lamp-holding arm.

4. In a device as specified, the combination with a search light having an attaching socket, of an arm secured in said socket, an angle plate, one wing of which is axially pivoted to said arm and in resilient frictional engagement therewith, a stationary arm having a horizontal portion, a plate having a hub adjustably secured on said horizontal portion, said plate being axially pivoted to the other member of the angle plate and in resilient frictional contact therewith.

5. In a device as specified, the combination with a stationary plate, of an angle plate, one wing of which is axially pivoted to said plate and in resilient frictional contact therewith; a lamp-holding arm axially pivoted to the other wing of the angle plate and in resilient frictional contact therewith, the contacting faces of the parts being formed with interlocking grooves and ribs, and means whereby the lamp-holding arm may be shifted to bring its axial center out of line with the axial center of the contacting wing of the angle plate.

6. In a device as specified, the combination with a stationary plate and an angle plate, one wing of which is axially pivoted to the stationary plate, and in resilient frictional contact therewith, of a lamp-holding arm having an elongated axial aperture, a bolt extending through said aperture and securing said arm to the other wing of the angle plate, means for clamping the arm to the said wing under a resilient frictional tension, the engaging faces of the parts being formed with interlocking ribs and grooves, a lug on the lamp arm, a lug on the adjoining wing of the angle plate in the rotary path of the lug on the arm, and a handle on the lamp arm, said lamp arm being shifted by the forcible engagement of its lug with the lug on the adjoining wing, so that the pivotal center of the arm will be out of line with that of the wing.

7. In a device as specified, a stationary tubular arm, a plate having a depending hub secured upon the stationary arm, an angle plate, one wing of which is axially pivoted to the plate and in resilient frictional engagement therewith; a lamp arm, a tubular pivot bolt passing axially through the lamp arm and through the other wing of the angle plate, and means for holding the wing and lamp arm under resilient frictional tension, and an electric search light on the said arm having feed wires extending therefrom, said wires being passed through the tubular bolt, and tubular supporting arm, to a source of energy, thereby being prevented from twisting or kinking, when the lamp is swung on a horizontal plane, or tipped on the said tubular bolt.

In testimony whereof I affix my signature in presence of two witnesses.

FRANK JACKSON.

Witnesses:
  G. SARGENT ELLIOTT,
  ADELLA M. FOWLE.